United States Patent [19]

Bilco

[11] 3,738,665
[45] June 12, 1973

[54] HYDRAULIC SEALS
[75] Inventor: Arthur Bilco, Greene, N.Y.
[73] Assignee: The Raymond Corporation, Greene, N.Y.
[22] Filed: Jan. 3, 1972
[21] Appl. No.: 215,043

[52] U.S. Cl. .................. 277/3, 277/27, 277/59, 277/205
[51] Int. Cl. ............................................. F16j 15/32
[58] Field of Search .............. 277/58, 59, 65, 205, 277/188, 3, 13, 15, 27, 124

[56] References Cited
UNITED STATES PATENTS
2,979,350  4/1961  Lansky ............................... 277/205
2,907,596  10/1959  Maha .................................. 277/188

Primary Examiner—Herbert F. Ross
Assistant Examiner—Robert I. Smith
Attorney—Richard G. Stephens

[57] ABSTRACT

A tandem hydraulic seal assembly includes a graphite-filled Teflon inner seal and a molybdenum disulfide-filled polyurethane outer seal. The pressure drop across the inner seal limits the pressure on the outer seal to values low enough to prevent high friction. The outer seal compresses axially when pressure is applied to it to admit fluid to its grooved seat, and expansion of the outer seal when pressure is relieved pumps fluid back past the inner seal to the pressure chamber.

8 Claims, 5 Drawing Figures

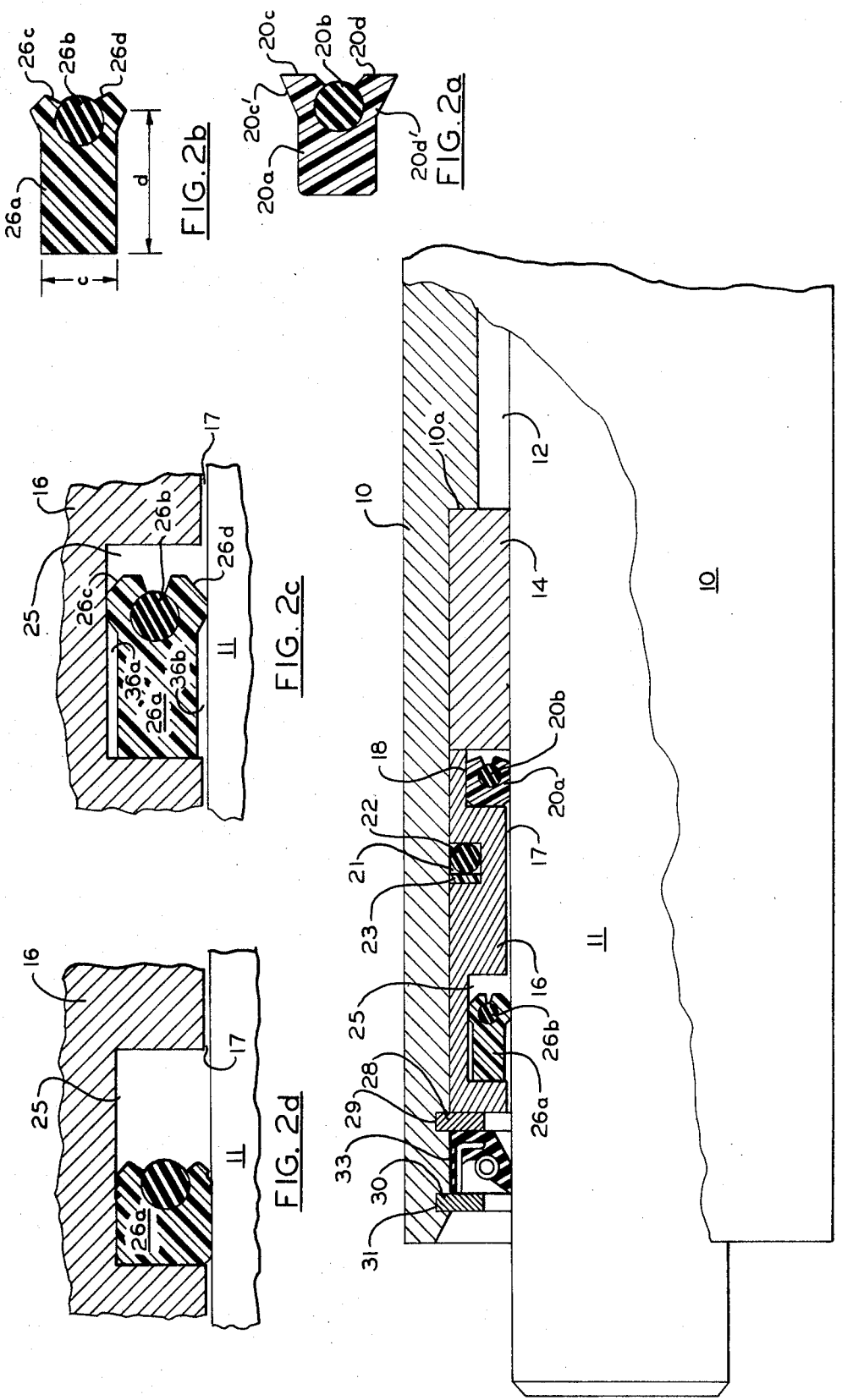

HYDRAULIC SEALS

My invention relates to pressure seals, and more particularly to improved hydraulic pressure seals for use in hydraulic rams and like devices. The invention has particular utility in high-pressure hydraulic actuators of the types used on lift trucks and other material-handling devices.

A requirement to move heavy loads with small-size actuators in turn requires that high hydraulic pressures, which may vary from zero up to the order of 5000 psi, be used. A hydraulic seal interposed between a hydraulic cylinder and a movable piston or ram desirably would be very tight so as to minimize fluid leakage. On the other hand, provision of a seal which is extremely tight not only increases friction, wasting power, but also causes rapid seal wear and chatter, so that an engineering compromise has been required. It is one object of the invention to provide an improved hydraulic seal arrangement wherein very little fluid leakage occurs, and where friction, chatter and wear are minimized.

In accordance with one concept of the present invention, two disimilar seals are used in tandem on a hydraulic actuator, one being made of a material such as molybdenum disulfide-filled polyurethane, and the other made of a material such as graphite-filled "Teflon". Teflon is the DuPont trademark applied to polymers of tetrafluroethylene. Polyurethane has superior sealing properties, and long-wearing polyurethane seals adequate for use at low pressures are easy to design. However, because of the elasticity of polyurethane, it is extremely difficult to design a polyurethane seal which will open at high pressures without causing great drag resistance, or moving friction, and chatter. In accordance with a further concept of the invention, the Telfon seal is used in tandem with the polyurethane seal to provide a pressure drop. Thus even if a pressure differential of 5,000 psi exists between the inside and outside of the cylinder, a substantial pressure drop occurs across the Teflon seal, thereby reducing the pressure across the polyurethane seal to a value such that it does not create great moving friction or chatter due to static friction.

Various arrangements of tandem hydraulic seals have been known in the prior art. A problem commonly encountered with such arrangements is that hydraulic fluid seeps past the first seal and becomes trapped between the pair of seals, and then some fluid eventually may seep past the second seal and leak from the cylinder. In accordance with a central, very important concept of the present invention, leakage is substantially reduced by arranging the second or outer seal so that it tends to "pump" any fluid entrapped between the two seals back past the inner seal into the hydraulic cylinder. As will be seen below, the polyurethane outer seal, being substantially compressible, compresses when pressure is applied, and upon the removal of pressure, the outer seal expands, forcing much of the entrapped fluid back past the less-closely-fitting inner seal to the inside of the hydraulic cylinder, and an important object of the invention is to provide a tandem seal arrangement having such a characteristic.

Other objects of the invention will in part be obvious and will in part appear hereinafter.

The invention accordingly comprises the features of construction, combination of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

FIG. 1 is a view of one form of piston-cylinder assembly incorporating one form of the invention, with portions of the cylinder shown cutaway to reveal components of the seal assembly.

FIG. 2a is a cross-section view through an annular inner seal used in the assembly of FIG. 1.

FIG. 2b is a cross-section view through an annular outer seal used in the assembly of FIG. 1.

FIG. 2c is an enlarged view of a portion of the assembly of FIG. 1, showing the outer seal of FIG. 2b installed a portion of the assembly of FIG. 1, and illustrating the configuration of the outer seal when the assembly is not subjected to hydraulic pressure.

FIG. 2d is a view similar to FIG. 2c illustrating the compression of the outer seal when the assembly is subjected to hydraulic pressure.

Referring now to FIG. 1, the assembly there shown comprises cylinder 10, portions of which have been cutaway, and piston 11 reciprocable therein. The omitted right-end portions of cylinder 10 and piston 11 are completely conventional. Hydraulic fluid is admitted under pressure to the interior of cylinder 10, filling the chamber 12, and urging piston 11 leftwardly. The left end of piston 11 is connected to a device (not shown) to be moved, in conventional fashion. Piston 11 may be either single-acting or double-acting.

The wall of cylinder 10 is provided with an annular shoulder 10a against which one or more (one is shown) bronze back-up rings 14 is stacked, each such ring having an inner bore a few thousandth inch (e.g., 0.002–0.004 in.) larger than the outer diameter of piston 11. Seated against ring 14 is seal gland member 16 of hard steel having an outer diameter approximately 0.002–0.004 in. less than the bore of cylinder 10 and an inner bore approximately 0.025 in. larger than the outer diameter of piston 11, so that a substantial annular clearance gap 17 exists between the gland member and the piston.

The right end of gland member 16 is provided with an enlarged internal bore, thereby to provide an annular cavity 18 bounded on its outside and left end by gland member 16, bounded on its right end by ring 14, and bounded on its inner side by piston 11. Situated within cavity 18 is inner seal 20, which preferably comprises a graphite-filled "U-cup" cross-section seal member 20a and O-ring 20b. The cross-section of inner seal 20 is shown in enlarged form in FIG. 2a, and in one successful embodiment of the invention inner seal 20 comprised Type 330670-327-A2 commercially available from W.S.Shamban & Co., of 2531 Bremer Drive, Fort Wayne, Indiana.

An intermediate exterior portion of gland member 16 is provided with a reduced diameter to provide an annular cavity as shown at 21, in which O-ring 22 and backup ring 23 are provided. O-ring 22 comprises a conventional elastomeric (e.g., Buna-N) ring of circular cross-section, and backup ring 23 comprises a split Teflon ring to prevent extrusion of O-ring 22. Compression of O-ring 22 in cavity 21 between gland member 16 and cylinder 10 prevents any seepage of fluid from cavity 18 past cavity 21.

A portion of gland member 16 near its left end is provided with an enlarged internal diameter to provide the further annular cavity shown at 25. Situated within cavity 25 is outer seal 26, which preferably comprises a molybdenum disulfide-filled polyurethane "U-cup" cross-section seal member 26a and O-ring 26 b. The cross-section of outer seal 26 is shown in enlarged form in FIG. 2b, and in one successful embodiment of the invention outer seal 26 comprised Type 18701750-375B commercially available from Parker Seal Company of Culver City, California.

Gland member 16 (and hence also the seal members in annular cavities 18, 21 and 25) is longitudinally fixed within cylinder 10 by a conventional spring-steel retaining ring 28 which snaps into annular recess 29 in the inside wall of cylinder 10. A second similar retaining ring 30 snaps into similar recess 31, and a conventional wiper ring 33 is retained between rings 28 and 30. Wiper ring 33 may comprise, for example, oil seal Type 64635 comercially available from Victor Manufacturing & Gasket Company of 5750 W.Roosevelt Road, Chicago, Illinois, which comprises a Buna N rubber ring with a gartertype spring retainer. The function of wiper ring 33 is to wipe dirt, dust, etc., from the surface of piston 11 to prevent seal damage. Wiper ring 33 is not made to withstand any appreciable hydraulic pressure. Atmospheric pressure is assumed to exist leftwardly of retainer ring 31 in FIG.1.

When high pressure exists in chamber 12, fluid is forced leftwardly past bronze ring 14 to inner seal 29, passing through the small clearance gap between ring 14 and piston 11, and sometimes passing between the outer face of ring 14 and cylinder 10. Ring 20b maintains lips 20c, 20d (FIG. 2a) of seal 20a spread partially apart, and fluid pressure in the right end of cavity 18 will be seen to tend to spread lips 20c, 20d further apart, pressing lip 20c against gland member 16, and pressing lip 20d against piston 11. If, on the other hand, the pressure on the rear side of seal member (adjacent faces 20c', 20d') is greater than that at the front side, a condition which often occurs when the pressure in chamber 12 is reduced, it will be seen that such a pressure differential will tend to wrap lips 20c, 20d more tightly around ring 20b, reducing the cross-section of seal 20 and tending to allow fluid to flow from the rear side to the front side of seal 20, i.e., rightwardly in FIG. 1. Thus seal 20 operates to block leftward fluid flow in FIG. 1 but allows rightward fluid flow at fairly low pressures (e.g., 50 psi).

If any fluid in cavity 18 passes radially outwardly between ring 14 and gland member 16 and then leftwardly between member 16 and cylinder 10, it is blocked by O-ring 22. Complete blockage of any such leakage is readily accomplished by O-ring 22, even at very high pressures, of course, since no relative movement occurs between O-ring 22, gland member 16, and cylinder 10. Thus the only fluid which passes leftwardly from cavity 18 is that which passes between lip 20d and piston 11. That fluid may flow readily through clearance gap 17 to cavity 25, where it encounters outer seal 26. FIG. 2b illustrates seal 26 in its free, or "not-installed" condition, and FIG.2c illustrates seal 26 installed in cavity 25, with little or no fluid pressure assumed to exist in cavity 25.

Ring 26b maintains lips 26c, 26d, of seal 26b spread partially apart, and the occurence of fluid pressure in the right end of cavity 25 when chamber 12 is pressurized will be seen to urge the lips further apart, lip 26c being urged radially outwardly against member 16 and lip 26d being urged radially inwardly against piston 11. Because of its compressibility, polyurethane seal member 26a conforms very closely under pressure to the surface of piston 11 and member 16, providing a very effective seal. As previously mentioned, polyurethane seals have been previously used in the prior art, but ordinarily only in much lower pressure applications, since the application of pressures approaching 5000 psi causes such seals to grip the relatively-moving metal surfaces so tightly as to cause unacceptable friction. In the present invention, however, even though the pressure in chamber 12 may reach a level such as 5000 psi, inner Teflon seal 20 provides a substantial pressure drop, so that the pressure in cavity 25 applied to polyurethane seal 26 seldom if ever exceeds 100 psi, a value low enough that outer seal 26 seals very effectively without creating unacceptable friction. The magnitude of the maximum pressure which occurs in cavity 25 is, of course, a function of time, and the pressure applied to the polyurethane outer seal could eventually rise to the cylinder pressure (e.g., 5000 psi) if the cylinder were to be pressurized at maximum pressure for a very long time, or indefinitely. Most practical applications of hydraulic actuators, however, do not require the maintenance of high pressures for extremely long periods of time. Furthermore, even in those applications where high pressure is applied for a long time in order to hold a heavy load in position, the application of unusually high pressure to the polyurethane outer seal causes no harm, the tightness with which that seal grips the piston being irrelevant, of course, while the piston is not moving, and the extra tightness being beneficial, since it prevents leakage which occurs when many prior art seals are subjected to pressure for long periods of time. Thus the only operational procedure under which seal 26 may cause undesirable friction or chatter is very slow operation at slightly increased pressure following a long period of high pressurization.

It is important to note that the thickness (dimension c in FIG. 2b) of outer seal member 26a is chosen so that it does not fill the portion of cavity 25 leftward of lips 26c, 26d during the low or zero pressure conditions illustrated in FIG. 2c, leaving unfilled annular spaces 36a, 36b. Further, seal member 26a is formed of a compressible material, and provided with a substantial width (dimension d in FIG. 2b). As hydraulic fluid pressure rises at the right end of cavity 25, it compresses seal 26 leftwardly, translating lips 26c, 26d and ring 26b leftwardly and decreasing unfilled spaces 36a, 36b, so that a substantial amount of the fluid which passes through clearance gap 17 enters the right end of cavity 25. The compression of seal 26 within cavity 25 under high pressure is illustrated in FIG. 2d, by an exaggerated amount. It is important to note that the compressibility of outer seal 26 is chosen so that substantial compression of the seal takes place at pressures considerably below the maximum cylinder pressure, since, as explained above, seal 26 rarely will be subjected to maximum cylinder pressure in most applications. In the specific embodiment alluded to, the pressure in cavity 25 is believed to have ranged up to 100 psi with pressures of 5000 psi applied to the cylinder and seal 20.

When pressure is reduced in chamber 12 (FIG.1), and hence reduced in cavity 18, clearance gap 17 and cavity 25, seal 26 expands, reverting from the configuration shown in FIG. 2d to that shown in FIG. 2c, and such expansion of seal 26 will be seen to force fluid from cavity 25 through clearance gap 17, back past inner seal 20 and ring 14 toward chamber 12. Thus compressible seal 26 will be seen to act much like a spring-restrained piston within cavity 25, pumping back fluid when cylinder pressure is reduced. This action, together with the effective sealing properties of the polyurethane seal, results in superior sealing action, minimizing hydraulic fluid leakage.

While outer seal member 26a has been disclosed as preferably comprising molybdenum disulfide-filled polyurethane and inner seal member 20a disclosed as preferably comprising graphite-filled "Teflon", it will be readily appreciated that other materials having similar physical properties may be substituted without departing from the invention. It is believed that the material of inner seal 20a preferably should have approximately the following mechanical properties.

| Property | Values | ASTM Test Method |
|---|---|---|
| Tensile strength, psi | 2000–5000 | D1457 |
| Elongation, % original length | 190–240 | D1457 |
| Friction coefficient (static) | 0.14 | |
| Friction coefficient (dynamic) | 0.12 | |
| Flexural strength, (1% strain) psi | 950 or greater | D790 |
| Flexural modulus ($\times 10^5$) | 2.06 | |
| Compressive strength (0.2% offset) psi | 1100 or greater | D695 |
| Compressive modulus ($\times 10^4$) | 9.2 | |
| Coefficient of expansion ($\times 10^{-5}$)in/in/°F | 7–9.5 | D696 |
| Hardness (Shore D Durometer) | 50–65 | D785 |

It is believed that the material of outer seal 26a preferably should have approximately the following mechanical properties.

| Property | Values | Test Method |
|---|---|---|
| Tensile strength, psi | 6000–8400 | ASTM D1000 |
| Elongation, % | 400–650 | |
| Extension modulus (100%) psi | 1600 | |
| Extension modulus (300%) psi | 2500 | |
| Compression set, % | 30% or less | Method B, 70 hours, 158°F, applied discs. |
| Impact resilience | 35% or greater | ASTM D2632 |
| Flexural strength (1% strain), psi | 700 or greater | D790 |
| Compressive strength (0.2% offset), psi | 20,000 or greater | |
| Coefficient of expansion ($\times 10^{-5}$)in/in/°F | 0.09–0.14 | |
| Hardness (Shore D Durometer) | 30–46 | |

It will be readily apparent without further drawing Figures that, by a simple reversal of parts, cylinder 10 may be provided with a smooth internal wall and member 16 and the seal members mounted to be carried on piston 11 to provide equivalent operation. It also will become apparent that one of seals 20 and 26 may be mounted in cylinder 10 and the other mounted on piston 11 in applications where the piston has a limited stroke or the length of gap 17 is increased appreciably. While the actuator shown was designed for an application requiring reciprocating motion, it will be apparent that the invention is applicable as well to rotary seals, such as if the member shown as piston 11 comprised a rotatable shaft extending from a pressurized housing, with cylinder 11 acting as bearing means. Furthermore, while the invention has been illustrated in connection with a hydraulic actuator, it will become apparent that it is applicable as well to various forms of hydraulic pumps and motors.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawing shall be interpreted as illustrative and not in a limiting sense.

The embodiments of the invention in which an exclusive property or privilege is claimed are defined as follows:

1. A hydraulic fluid seal arrangement for sealing between first and second relatively movable members having complementary cylindrical working surfaces with a clearance gap therebetween, said members having first and second annular grooves axially spaced from each other, each of said grooves being juxtaposed to the working surface of the other of said members,- said first annular groove being situated axially in between a fluid chamber and said second annular groove; a first annular seal situated in said first annular groove; a second annular seal situated in said second annular groove, said second annular seal being substantially more compressible under pressures less than a maximum working pressure than said first annular seal is compressible at said maximum working pressure, and said second annular seal having a coefficient of friction versus pressure characteristic which provides undesirably high friction at pressures above a predetermined pressure less than said maximum working pressure, whereby when said maximum working pressure exists in said chamber said first annular seal causes a pressure drop to maintain the pressure at said second annular seal less than said predetermined pressure.

2. A seal arrangement according to claim 1 wherein the cross-section of said second seal is less than the cross-section of said second annular groove, a first axial portion of said second seal having a radial thickness greater than the depth of said second groove and a second axial portion having a radial thickness no greater than said depth, said first axial portion being axially located in between said second axial portion and said first groove, whereby application of fluid pressure through said clearance gap to said second groove axially compresses said second seal in said second groove, and said second seal axially expands to force fluid back from said second groove through said clearance gap upon the reduction of pressure in said chamber.

3. A seal arrangement according to claim 1 wherein said first seal comprises a tetrafluoroethylene fluorocarbon material and said second seal comprises polyurethane.

4. A seal arrangement according to claim 1 wherein said first and second relatively movable members comprise a bearing means and a cylindrical shaft, respectively, said shaft being adapted to rotate within said bearing means.

5. A seal arrangement according to claim 1 wherein said first and second grooves are axially spaced apart along an internal wall portion of said cylinder.

6. A seal arrangement according to claim 1 wherein said second annular seal has a generally U-shaped cross-section comprising a rear base portion from which a pair of lip portions extend generally axially toward said first annular seal, and ring means situated between said pair of lip portions.

7. A hydraulic fluid seal arrangement for sealing between first and second relatively movable members having complementary cylindrical working surfaces with a clearance gap therebetween, a first of said members having first and second annular grooves axially spaced from each other, each of said grooves being juxtaposed to the working surface of the second of said members, said first annular groove being situated axially in between a fluid chamber and said second annular groove, said fluid chamber communicating with said first annular groove; a first annular seal situated in said first annular groove, said second annular seal having a cross-section less than that of said second groove thereby providing an unfilled space in said second groove, said second annular seal being axially compressible into said unfilled space upon application of fluid pressure to said second groove thereby to admit fluid to said second groove, and expandable upon reduction of fluid pressure in said chamber to force fluid from said second groove through a portion of said clearance gap toward said first groove, wherein said second seal is substantially more compressible under pressures less than a predetermined pressure than said first seal is compressible at a maximum working pressure, said second seal having a coefficient of friction versus pressure characteristic which provides undesirably high friction at pressures above said predetermined pressure, said first seal providing a pressure drop from the pressure in said chamber to maintain the pressure applied to said second seal at a value less than said predetermined pressure during normal operation.

8. A seal arrangement according to claim 7 wherein said first seal comprises a tetrafluorethylene fluorocarbon material and said second seal comprises polyurethane.

* * * * *